United States Patent [19]

Witman

[11] 4,423,100
[45] Dec. 27, 1983

[54] DIFFERENTIALLY ADHERING RELEASE COATINGS FOR VINYL CHLORIDE-CONTAINING COMPOSITIONS

[75] Inventor: Jack H. Witman, East Hempfield Township, Westmoreland County, Pa.

[73] Assignee: Armstrong World Industries, Inc., Lancaster, Pa.

[21] Appl. No.: 392,646

[22] Filed: Jun. 28, 1982

[51] Int. Cl.³ ............... B65B 33/00; B32B 23/08; B32B 27/10

[52] U.S. Cl. ............... 428/42; 428/507; 428/532; 427/154; 427/155; 524/35; 524/37; 524/39; 524/42; 264/300; 264/304

[58] Field of Search ............... 524/35, 37, 38, 39, 524/40, 41, 42, 43, 44, 45, 46, 31, 33, 716, 733; 428/507, 532, 42; 264/130, 171, 255, 300, 304; 427/154, 155

[56] References Cited

U.S. PATENT DOCUMENTS

| | | | |
|---|---|---|---|
| 2,746,893 | 5/1956 | Matthes | 428/211 |
| 3,017,284 | 1/1962 | Lambert et al. | 427/135 |
| 3,034,915 | 5/1962 | Kornbluth | 427/155 |
| 3,066,033 | 11/1962 | Clark | 428/532 |
| 3,300,327 | 1/1967 | Smith et al. | 229/3.1 |
| 3,342,686 | 9/1967 | Jewel et al. | 424/61 |
| 3,370,025 | 2/1968 | Salo et al. | 524/39 |
| 3,429,840 | 2/1969 | Lowe, Jr. | 524/38 |
| 3,442,731 | 5/1969 | Anderson | 156/71 |
| 3,480,466 | 11/1969 | Benson et al. | 428/340 |
| 3,529,049 | 9/1970 | Abell et al. | 264/112 |
| 3,556,826 | 1/1971 | Gronholz et al. | 524/31 |
| 3,788,941 | 1/1974 | Kupits | 428/507 |
| 3,922,464 | 11/1975 | Silver et al. | 428/355 |
| 3,959,193 | 5/1976 | Putnam et al. | 106/193 J |
| 4,113,650 | 9/1978 | Putnam et al. | 252/363.5 |

FOREIGN PATENT DOCUMENTS

| | | | |
|---|---|---|---|
| 43-15702 | 7/1968 | Japan | 428/507 |
| 55-97953 | 7/1980 | Japan | 428/507 |

*Primary Examiner*—John Kight, III
*Assistant Examiner*—Nathan M. Nutter
*Attorney, Agent, or Firm*—Laird F. Miller

[57] ABSTRACT

The present invention relates to release coatings which comprise cellulosic esters or cellulosic ethers in combination with adhesion-promoting compounds having an affinity for vinyl chloride-containing compositions. The release coatings maintain their adherence characteristics during processing of the structure in which they are disposed, but substantially lose their adherence characteristics when said structure is fused, thereby becoming easily separable from the resulting product.

34 Claims, No Drawings

DIFFERENTIALLY ADHERING RELEASE COATINGS FOR VINYL CHLORIDE-CONTAINING COMPOSITIONS

The present invention relates to release coatings and more particularly to release coatings which demonstrate differential adherence characteristics.

BACKGROUND OF THE INVENTION

Release coatings are in wide use in the development of laminated structures, and in particular in the construction of flooring materials. Typically, a support surface or carrier such as paper or felt is provided with a release coat which is then adhered to a material comprising vinyl chloride. After adding other layers of materials or otherwise processing such a structure, it is separated from the release surface, thereby giving a finished product or an intermediate which is usable in further processing steps.

When building such structures, it is especially desirable for the release coating to adhere strongly to the applied vinyl chloride-containing material so that a uniform product is obtained. If delamination occurs during processing, an inferior product will result. Similarly, if the release coating adheres firmly throughout the processing step but continues to adhere firmly when release is desired, a defective product may likewise result.

THE PRIOR ART

Release coatings are described in a number of prior art references. U.S. Pat. No. 2,746,893 describes a dry-strip structure which is designed to transfer a decal-borne design from a release paper. The structure comprises an activatable adhesive to adhere the image to the new substrate, an image, a cellulose acetate stripping layer, a gum coating and a support paper. U.S. Pat. No. 3,115,386 discloses the use of certain release surfaces between a consolidating surface and a vinyl chloride-containing plastic in order to facilitate release of the plastic from the consolidating surface. U.S. Pat. No. 4,118,541 discloses releasable sheets comprising a cellulosic paper sheet coated with a first coating comprising an oil-modified alkyd resin which is cross-linked with a polymethylol melamine and a second coating comprising a copolymeric material of defined structure. U.S. Pat. No. 4,159,219 discloses the use of methyl cellulose and polypropylene glycol in release compositions for flooring materials. U.S. Pat. No. 4,282,054 discloses a release sheet comprising a release agent, a cross-linkable thermoplastic resin and a water dispersable organic compound containing polyoxyethylene, polyoxypropylene or a block copolymer of polyoxyethylene and polyoxypropylene.

Although these references, and others, disclose a wide variety of release coatings which are currently in use in industry, these coatings have not proved to be entirely satisfactory, particularly where vinyl chloride-containing compositions are used. The reason for this is that most compositions which firmly adhere to the vinyl chloride material during processing similarly tend to adhere strongly when release is desired, thereby tending to cause some damage to the resulting product during the release step. On the other hand, reducing the adhesive character of the release coating is not always satisfactory because of the problems which can be encountered with premature delamination.

Accordingly, one object of the present invention is to provide a release coating which will strongly adhere a vinyl chloride-containing composition to a release carrier during processing, but which will easily release said composition from said carrier when processing is complete.

Another objective of the present invention is to provide differentially releasing carriers which will be applicable to flooring products.

These and other advantages of the present invention will become apparent from the detailed description of preferred embodiments which follow.

SUMMARY OF THE INVENTION

The present invention relates to release coatings which comprise cellulosic esters or cellulosic ethers in combination with adhesion-promoting compounds having an affinity for vinyl chloride-containing compositions. The release coatings maintain their adherence characteristics during processing of the structure in which they are disposed, but substantially lose their adherence characteristics when said structure is fused, thereby becoming easily separable from the resulting product.

DETAILED DESCRIPTION OF PREFERRED EMBODIMENTS

In one embodiment the present invention comprises a film-forming composition, said film-forming composition comprising at least one cellulosic ether or cellulosic ester having a melting point not less than about 220° F., at least one adhesion-promoting compound having an affinity for polymeric vinyl chloride-containing compositions, and an organic solvent, said film-forming composition being adaptable to differentially bond a carrier to a subsequently applied polymeric vinyl chloride-containing composition.

In a second embodiment, the present invention comprises a releasable coating film adaptable to differentially bond a carrier to a subsequently applied polymeric vinyl chloride-containing composition, said film comprising at least one cellulosic ether or cellulosic ester having a melting point not less than about 220° F., and at least one adhesion-promoting compound having an affinity for said composition, said film being suitable to initially bond the carrier to said composition in an essentially secure manner, but being capable of substantially losing its bonding ability when said composition is fused.

In a third embodiment, the present invention comprises a process for preparing a fused vinyl chloride-containing structure, said process comprising the steps of providing a carrier with a releasable coating film, said film comprising (a) at least one cellulosic ether or cellulosic ester having a melting point not less than about 220° F., and (b) at least one adhesion-promoting compound having an affinity for polymeric vinyl chloride-containing compositions; adhering a vinyl chloride-containing composition to the coated carrier; selectively processing and fusing the composite structure; and separating said carrier from the resulting fused polyvinyl chloride-containing composition, said coating film securely bonding said carrier to said composite structure during processing, but substantially losing its bonding capability when said composite structure is fused.

Release coatings known in the art have usually been formulated such that the adhesion and, hence, the force necessary to induce separation remains essentially constant during and after processing. Such coatings have traditionally been selected to demonstrate rather specific adhesive characteristics, depending on the process involved. Thus, release coatings are expected to adhere firmly enough that they will not permit delamination during processing, but not so firmly that the product is adversely affected when the product is separated from the carrier. Unfortunately, this balance has often been difficult to achieve.

Surprisingly, Applicant has discovered that release coatings which are capable of adhering a vinyl chloride-containing composition to a carrier may be prepared whereby strong adhesion is maintained during processing, after which the coating loses its adhesion capabilities and permits easy separation of the product from the carrier. Such coatings may be adapted for use under a wide variety of processing conditions and they are neither taught nor suggested by the prior art.

Two major components are required to practice the present invention. The first major component comprises at least one cellulosic ether or cellulosic ester having a melting point not less than about 220° F., but preferably not less than about 250° F. Such cellulosic compounds have a relative lack of affinity for vinyl chloride-containing compositions and, thus, are critical to the practice of the present invention. Examples of compounds which have given very satisfactory results when practicing the present invention are organic cellulose esters such as cellulose acetate propionate and cellulose acetate butyrate; inorganic cellulose esters such as nitrocellulose; and cellulose ethers such as ethylcellulose and methylcellulose.

The second major component of the release coating of the present invention comprises an adhesion promoting compound having an affinity for vinyl chloride-containing compositions. Such compounds compensate for the non-affinity of the cellulosic components for the vinyl chloride-containing composition. A wide variety of compounds fit this description, examples of which are polymethyl methacrylate, copolymers of methyl methacrylate and butyl methacrylate, arylsulfonamide-formaldehyde condensates, ortho- and para-toluenesulfonamides, plasticizers such as dicyclohexyl and diphenyl phthalate, polyester resins, maleic acid resins, and polyamide resins. For convenience, these compounds are also referred to herein as "modifying resins."

Preferably, the cellulosic components and the modifying resins will be compatible with one another. Certain of these materials tend to be immiscible, even in the presence of an effective solvent. Ideally, the use of such incompatible components should be avoided although a certain degree of incompatibility may be permissible in certain situations. A good example of a cellulosic component whose utility is diminished because of incompatibility with many of the modifying resins is cellulose acetate.

Virtually any solvent may be used provided it is compatible with the aforementioned major components. Preferably, low-boiling solvents such as alcohols, esters and ketones will be used, either alone or in combination, because they are good solvents which are easily volatilized. In addition, a nitroparaffin blend comprising 70% nitroethane, 25% isopropyl acetate and 5% cellosolve acetate has proved to be a very useful solvent system, primarily due to the combination of good solvency demonstrated by the blend and the gradient evaporation shown by the individual components.

The release coating film which is produced from these components will desirably be smooth and bubble free, have uniform adhesion characteristics during processing and demonstrate a uniform gloss. Little or no penetration of the film into the carrier need be obtained.

To practice the present invention at least one of each of the major components indicated above are dissolved in a suitable solvent. The relative amounts of these components can vary widely depending on the processing conditions which will be employed, as well as on the characteristics of the components. Thus, for each 100 parts of the major components, usually from about 20 to about 95 parts by weight of cellulosic ester or ether may be used in combination with from about 80 to about 5 parts by weight of modifying resin to give suitable release coatings.

The wide variation of applicable ranges may be more clearly illustrated by the following. When mixtures comprising a total of 100 parts by weight of polymethylmethacrylate (PMMA) and cellulose acetate propionate (CAP) were used to form release coatings, suitable results were obtained using from about 50 to about 6 parts by weight of PMMA in combination with from about 50 to about 94 parts by weight of CAP. The preferred ranges were from about 33 to about 9 parts PMMA in combination with from about 67 to about 91 parts of CAP.

On the other hand, when release coatings were prepared comprising a total of 100 parts by weight of toluenesulfonamide-formaldehyde resin (TFR) and CAP, from about 75 to about 15 parts by weight of TFR were used in combination with from about 25 to about 85 parts by weight of CAP. The preferred ranges were from about 67 to about 20 parts TFR in combination with from about 33 to about 80 parts CAP.

After the solution is prepared, it is applied to the surface of the carrier, usually at least at a level of from about 1 to about 10 pounds for every 100 square yards of surface, after which the solvent is allowed to evaporate. The polyvinyl chloride-containing composition is then applied to the surface of the dried release coat and the composite material is processed as desired. For the examples provided herein, the maximum processing temperature did not exceed about 300° F. prior to the final heating step. However, this temperature is not an absolute limitation and may be substantially higher or lower depending on the components and the processing conditions which are employed. After processing, a final heating step induces loss of adhesion, permitting easy separation of the carrier. Preferably, the strongest adhesion at this stage will be between the carrier and the release coat so that the relase coat remains with the carrier after separation.

The manner in which release coatings of the present invention operate is not clearly understood. However, while Applicant herein does not desire to be bound to any particular theory of operability, it appears that the differential release characteristics demonstrated by the present release coatings are attributable to a migration of the cellulosic compounds and/or the modifying resins at elevated temperature.

As previously indicated, the cellulosic compounds have a limited affinity for the vinyl chloride-containing compositions. These cellulosic materials are essentially equally distributed throughout the release coat when it is applied to the carrier layer. During most of the processing steps the temperature usually remains below about 300° F. and this relatively uniform composition appears to be maintained. However, at the conclusion of the processing steps, the composite structure is normally fused at about 350°–400° F. for a period of time. When this occurs, it is believed that the cellulosic materials in the release coating tend to migrate away from the vinyl chloride-containing composition thereby tending to concentrate along the surface of the carrier. Alternatively, or at the same time, the modifying resins may similarly migrate toward or into the vinyl composition. In either event, the apparent migration effectively destroys the adhesion characteristics of the release coating, resulting in an extremely easy separation of the fused vinyl chloride composition from the carrier.

Support for this hypothesis has been obtained by laboratory experimentation using Fourier Transform Infrared Spectroscopy (FTIR). Studies of a release coating comprising cellulose acetate propionate and polymethyl methacrylate have shown that, after separation occurred, the surface of the polyvinyl chloride composition had bands which indicated a concentration of polymethyl methacrylate, whereas the surface of the release coating remaining on the release paper showed no bands corresponding to the polyvinyl chloride composition.

The following examples are provided to illustrate but not to limit the scope of the present invention.

EXAMPLES

GENERAL INFORMATION

Carriers coated with a release coating were prepared as described in the following examples. After preparation of the coated carrier, the following processing steps were followed for all examples.

The first step was the application of a base coating comprising a polyvinyl chloride plastisol having the following composition.

| Ingredient | Parts by Weight |
| --- | --- |
| Dispersion grade PVC homopolymer | 43 |
| Blending grade PVC homopolymer | 29 |
| Dioctyl phthlate plasticizer | 12 |
| 2,2,4-Trimethyl-1,3-pentanediol diisobutyrate ester plasticizer | 10 |
| Butyl benzyl phthalate plasticizer | 5 |
| Barium, calcium, zinc, phosphorus stabilizer | 2 |

This plastisol was applied as a 6-mil layer to the release coating and was gelled at 260° F. for two minutes.

After application of the base layer, a foamable plastisol having the following composition was applied.

| Ingredient | Parts by Weight |
| --- | --- |
| Dispersion grade PVC homopolymer | 74 |
| Blending grade PVC homopolymer | 26 |
| Octyl tallate epoxy plasticizer | 1 |
| Dioctyl phthalate plasticizer | 54 |
| Zinc neodecanoate stabilizer | 1.7 |
| Barium neodecanoate stabilizer | 0.6 |
| Azodicarbonamide blowing agent | 2.6 |
| Pigment | 4.0 |

A 22-mil layer of the foamable plastisol was applied to the gelled substrate and gelled at 270° F. for two minutes. The Wire Method Key Test as hereinafter described was performed at this stage on the gelled samples.

The gelled surface was then rotogravure printed with a pattern using fast-drying inks, and the printed surface was covered with a plastisol clear coat having the following composition.

| Ingredient | Parts by Weight |
| --- | --- |
| Dispersion grade PVC homopolymer | 94 |
| Blending grade PVC homopolymer | 6 |
| Dioctyl phthalate plasticizer | 14 |
| 2,2,4-Trimethyl-1,3-pentanediol diisobutyrate ester plasticizer | 18 |
| Butyl benzyl phthalate | 10 |
| High boiling blend of aromatic and aliphatic solvents | 5 |
| Octyl tallate epoxy plasticizer | 3 |
| Zinc octoate stabilizer | 0.2 |
| Barium neodecanoate stabilizer | 0.4 |

A 10-mil coating of the clear coat was applied to the composite structure and the coated material was then heated at 395° F. for three minutes to form the plastisol and fuse the structure. The foamed product was also evaluated using the Key Test.

Release Coat Performance Evaluation

The force required to delaminate or strip the carrier off of the vinyl product was measured according to the following conditions, referred to as a Wire Method Key Test. The test was conducted at 73.4° F. using a sample cut to a dimension of 2 inches by 6 inches. One end of the sample was delaminated slightly across its 2-inch width and a 0.022-inch gauge wire, stretched at each end by supports, was placed in the delamination zone. The delamination zone was then closed and the closed end of the sample was clamped in the upper jaw of an Instron Tensile Tester. The wire supports were attached by appropriate means to the lower jaw of the tester and the two jaws were separated at a rate of 6 inches per minute. As this occurred, the wire delaminated the structure. The force measured to cause delamination was a "key value," reported in pounds per 2-inch width.

EXAMPLE I

A prior art release coating was prepared having the following composition.

| Ingredient | Weight in Pounds |
| --- | --- |
| Ethyl cellulose | 11.7 |
| Denatured alcohol | 85.8 |
| Methyl ethyl ketone | 1.4 |
| Pigment dispersion in dioctyl phthalate | 1.1 |

The coating was applied at a rate of 3.7 pounds per 100 square yards of carrier using a rotogravure printing process. A clay coated kraft paper was employed as the carrier. The solvent was evaporated in an air stream and the non-foamable and foamable plastisol layers were applied and gelled as described above at 285° F. A sample of the structure was subjected to a Key Test, giving a key value of 0.33 pounds.

The sample was printed, clear coated and fused to give a foamed product which was also subjected to the Key Test. An average key value of 0.27 pounds was obtained.

EXAMPLE II

A release coating was prepared having the following composition.

| Ingredient | Weight in Pounds |
|---|---|
| 40% Solids PMMA solution (Acryloid A-102 from Rohm & Haas Co.) | 37 |
| Cellulose acetate propionate (CAP-482-0.5 from Eastman Chemical Co.) | 50 |
| Denatured alcohol | 82 |
| Ethyl acetate | 190 |
| Pigment | 2 |

This composition had a viscosity of 24 seconds measured using a No. 3 Zahn cup. The coating was applied at a rate of 3.2 pounds per 100 square yards of carrier using a rotogravure printing process. A clay-coated kraft paper was employed as the carrier. The solvent was evaporated in an air stream and the structure was then further processed as described above. No delamination occurred during processing, and the release carrier was easily stripped from the carrier after the final fusion step. The majority of the release coating remained with the carrier. Key tests performed on gelled samples and foamed samples as described above gave average key values of 2.99 and 1.05 pounds, respectively. These results clearly illustrate that the release coating maintained good adhesion during processing, but substantially lost its adhesion characteristics during the fusion step so as to allow easy delamination of the structure.

EXAMPLE III

A release coating was prepared having the following composition.

| Ingredient | Weights by Pounds |
|---|---|
| PMMA polymer (Acryloid A-11 from Rohm & Haas Co.) | 7.5 |
| Cellulose acetate propionate (CAP-482-0.5 from Eastman Chemical Co.) | 50 |
| Denatured alcohol | 53 |
| Isopropyl acetate | 46 |
| Nitroparaffin solvent blend (70% nitroethane, 25% isopropyl acetate and 5% cellosolve acetate) | 178 |
| Pigment | 1 |

The viscosity of this composition was 24 seconds measured using a No. 3 Zahn cup. The coating was applied to the paper and the structure was processed as earlier described. Results comparable to those described in Example II were obtained, the key values for the gelled and foamed samples being 2.72 and 0.87 pounds, respectively.

EXAMPLE IV

A release coating was prepared having the following composition.

| Ingredient | Weights by Pounds |
|---|---|
| Toluenesulfonamide-formaldehyde resin (Santolite MHP obtained from Monsanto Chemical Co.) | 33 |
| Cellulose acetate propionate (CAP-482-0.5 obtained from Eastman Chemical Co.) | 50 |
| Denatured alcohol | 78 |
| Ethyl acetate | 183 |
| Pigment dispersion in dioctyl phthalate | 4 |

The viscosity of this material was 24 seconds measured using a No. 3 Zahn cup. This release coating was applied to the carrier and treated in the usual manner. Key values for the gelled and foamed samples were 1.74 and 0.84 pounds, respectively.

EXAMPLE V

A release coating was prepared having the following composition.

| Ingredient | Weight by Pounds |
|---|---|
| Ethylcellulose (Standard Ethoxy grade, 7 cps, from Dow Chemical Co.) | 194 |
| Toluenesulfonamide-formaldehyde resin (Santolite MHP obtained from Monsanto Chemical Co.) | 386 |
| Nitroparaffin solvent blend | 1300 |
| Antioxidant | 3 |
| Octyl tallate epoxy plasticizer | 6 |
| Pigment dispersion in dioctyl phthalate | 26 |

The viscosity of this material was 24 seconds as measured using a No. 3 Zahn cup. This release coating was applied to a felt carrier having a rougher, more porous surface than that of the paper carrier. The coated felt was processed in essentially the same manner described above. A key value of 1.03 pounds was obtained for the foamed samples; however, no measurement could be obtained for the gelled sample which was so strongly adhered that delamination could not be started at forces which were less than 5-pound capacity of the test apparatus.

The present invention is not restricted solely to the descriptions and illustrations provided above but encompasses all modifications envisaged by the following claims.

What is claimed is:

1. A process for preparing a fused vinyl chloride-containing structure, said process comprising the steps of
providing a carrier with a releasable coating film, said film comprising
(a) at least one cellulosic ether or cellulosic ester having a melting point not less than about 220° F., and
(b) at least one adhesion-promoting compound having an affinity for polymeric vinyl chloride-containing compositions,
adhering a polymeric vinyl chloride-containing composition to the coated carrier,
selectively processing and fusing the composite structure, and
separating said carrier from the resulting fused polyvinyl chloride-containing composition, said coating film securely bonding said carrier to said composite structure during processing, but substantially losing its bonding capability when said composite structure is fused.

2. The invention as set forth in claim 1 hereof wherein the cellulosic compound has a melting point not less than about 250° F.

3. The invention as set forth in claim 1 hereof wherein said composition comprises from about 20 to about 95 parts by weight of cellulosic compound and from about 80 to about 5 parts by weight of adhesion-promoting compound, said proportions being based on a total of 100 parts of said compounds.

4. The invention as set forth in claim 3 hereof wherein said cellulosic compound has a melting point not less than about 250° F.

5. The invention as set forth in claims 1, 2, 3 or 4 hereof wherein said composition comprises cellulose acetate propionate and polymethyl methacrylate.

6. The invention as set forth in claim 5 hereof wherein said composition comprises from about 50 to about 94 parts by weight of cellulose acetate propionate and from about 50 to about 6 parts by weight of polymethyl methacrylate, said proportions being based on a total of 100 parts of these major components.

7. The invention as set forth in claim 6 hereof wherein said composition comprises from about 67 to about 91 parts by weight of cellulose acetate propionate and from about 33 to about 9 parts by weight of polymethyl methacrylate.

8. The invention as set forth in claims 1, 2, 3 or 4 hereof wherein said composition comprises cellulose acetate propionate and toluenesulfonamide-formaldehyde resin.

9. The invention as set forth in claim 8 hereof wherein said composition comprises from about 25 to about 85 parts by weight of cellulose acetate propionate and from about 75 to about 15 parts by weight of toluenesulfonamide-formaldehyde resin, said proportions being based on a total of 100 parts of these major components.

10. The invention as set forth in claim 9 hereof wherein said composition comprises from about 33 to about 80 parts by weight of cellulose acetate propionate and from about 67 to about 20 parts by weight of toluenesulfonamide-formaldehyde resin.

11. The invention as set forth in claims 1, 2, 3 or 4 hereof wherein the cellulosic compound is an organic cellulosic ester.

12. The invention as set forth in claim 11 herein wherein said ester is selected from the group consisting of cellulose acetate propionate and cellulose acetate butyrate.

13. The invention as set forth in claims 1, 2, 3 or 4 hereof wherein the cellulosic compound is an inorganic cellulosic ester.

14. The invention as set forth in claim 13 hereof wherein said ester is nitrocellulose.

15. The invention as set forth in claims 1, 2, 3 or 4 hereof wherein said cellulosic compound is a cellulosic ether.

16. The invention as set forth in claim 15 hereof wherein said ether is selected from the group consisting of ethylcellulose or methylcellulose.

17. The invention as set forth in claims 1, 2, 3 or 4 hereof wherein said adhesion promoting compound comprises at least one compound selected from the group consisting of polymethyl methacrylate, copolymers of methyl methacrylate and butyl methacrylate, arylsulfonamide-formaldehyde condensates, ortho- and para-toluenesulfonamides, dicyclohexyl phthalate, diphenyl phthalate, polyester resins, maleic acid resins, and polyamide resins.

18. A composite structure comprising
(a) a carrier layer,
(b) a polymeric vinyl chloride-containing composition, and
(c) a release coating layer disposed therebetween, said release coating layer comprising at least one cellulosic ether or cellulosic ester having a melting point not less than about 220° F. and at least one adhesion-promoting compound having an affinity for said composition, and being capable of differentially bonding said composition to said carrier.

19. The invention as set forth in claim 18 hereof wherein the cellulosic compound has a melting point not less than about 250° F.

20. The invention as set forth in claim 18 hereof wherein said film comprises from about 20 to about 95 parts by weight of cellulosic compound and from about 80 to about 5 parts by weight of adhesive-promoting compound, said proportions being based on a total of 100 parts of said compounds.

21. The invention as set forth in claim 20 hereof wherein said cellulosic compound has a melting point not less than about 250° F.

22. The invention as set forth in claims 18, 19, 20 or 21 hereof wherein said film comprises cellulosic acetate propionate and polymethyl methacrylate.

23. The invention as set forth in claim 22 hereof wherein said film comprises from about 50 to about 94 parts by weight of cellulose acetate propionate and from about 50 to about 6 parts by weight of polymethyl methacrylate, said proportions being based on a total of 100 parts by these components.

24. The invention as set forth in claim 23 hereof wherein said film comprises from about 67 to about 91 parts by weight of cellulose acetate propionate and from about 33 to about 9 parts by weight of polymethyl methacrylate.

25. The invention as set forth in claims 18, 19, 20 or 21 hereof wherein said film comprises cellulose acetate propionate and toluene sulfonamide-formaldehyde resin.

26. The invention as set forth in claim 25 hereof wherein said film comprises from about 25 to about 85 parts by weight of cellulose acetate propionate and from about 75 to about 15 parts by weight of toluene sulfonamide-formaldehyde resin, said proportions being based on a total of 100 parts by these components.

27. The invention as set forth in claim 26 hereof wherein said film comprises from about 33 to about 80 parts by weight of cellulose acetate propionate and from about 67 to about 20 parts by weight of toluene sulfonamide-formaldehyde resin.

28. The invention as set forth in claims 18, 19, 20 or 21 hereof wherein the cellulosic compound is an organic cellulosic ester.

29. The invention as set forth in claim 28 hereof wherein said ester is selected from the group consisting of cellulose acetate propionate and cellulose acetate butyrate.

30. The invention as set forth in claims 18, 19, 20 or 21 hereof wherein the cellulosic compound is an inorganic cellulosic ester.

31. The invention as set forth in claim 30 hereof wherein said ester is nitrocellulose.

32. The invention as set forth in claims 18, 19, 20 or 21 hereof wherein said cellulosic compound is a cellulosic ether.

33. The invention as set forth in claim 32 hereof wherein said ether is selected from the group consisting of ethyl cellulose or methyl cellulose.

34. The invention as set forth in claims 18, 19, 20 or 21 hereof wherein said adhesion-promoting compound comprises at least one compound selected from the group consisting of polymethylmethacrylate, copolymers of methylmethacrylate and butylmethacrylate, arylsulfonamide-formaldehyde condensates, ortho- and para-toluenesulfonamides, dicyclohexyl phthalate, diphenyl phthalate, polyester resins, maleic acid resins, and polyamide resins.

* * * * *